US005682387A

United States Patent [19]
Satoh

[11] Patent Number: 5,682,387
[45] Date of Patent: Oct. 28, 1997

[54] DEMAND ASSIGN MULTIPLEXER PROVIDING EFFICIENT DEMAND ASSIGN FUNCTION IN MULTIMEDIA SYSTEMS HAVING STATISTICAL MULTIPLEXING TRANSMISSION

[75] Inventor: Naoko Satoh, Tokyo, Japan

[73] Assignee: NEC Corporation, Tokyo, Japan

[21] Appl. No.: 531,967

[22] Filed: Sep. 21, 1995

[30] Foreign Application Priority Data

Sep. 21, 1994 [JP] Japan ................................. 6-225441

[51] Int. Cl.$^6$ ................................................ H04J 3/22
[52] U.S. Cl. .................................... 370/468; 370/532
[58] Field of Search ............................. 370/94.1, 94.2,
370/94.3, 60, 79, 80, 81, 85.7, 95.1, 95.3,
110.1, 112, 468, 477, 532, 535, 537, 538,
542, 543

[56] References Cited

U.S. PATENT DOCUMENTS

| | | | |
|---|---|---|---|
| 4,494,232 | 1/1985 | Dambrackas et al. | 370/80 |
| 4,528,659 | 7/1985 | Jones, Jr. | 370/80 |
| 5,121,385 | 6/1992 | Tominaga et al. | 370/80 |
| 5,313,467 | 5/1994 | Varghese et al. | 370/94.1 |

*Primary Examiner*—Douglas W. Olms
*Assistant Examiner*—Ajit Patel
*Attorney, Agent, or Firm*—Sughrue, Mion, Zinn, Macpeak & Seas, PLLC

[57] ABSTRACT

A demand assign multiplexer has a multiplexing portion multiplexing a signal which can be transmitted in a statistical multiplexing. Also, the multiplexer has an output element for outputting a channel assignment demand depending upon a signal from a system which requires guarantee of transparent data transfer which guarantees content of transfer in a normal state of a transmission path. A control portion controls to perform demand assign process with channel assignment depending upon the output of the statistical multiplexing processing portion; and the signals which require guaranteed transparent data transfers.

10 Claims, 7 Drawing Sheets

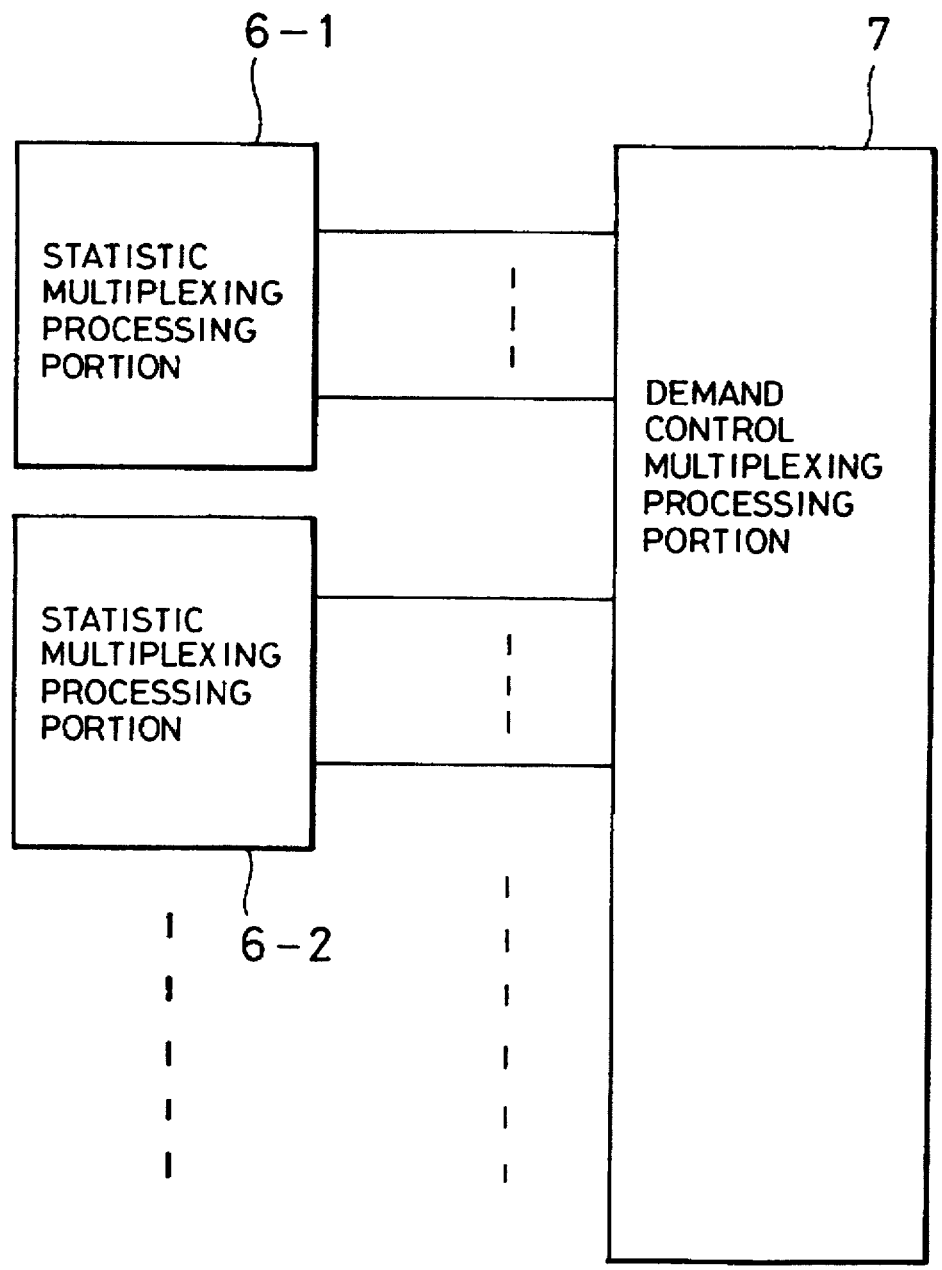

DEMAND ASSIGN MULTIPLEXER PROVIDIING EFFICIENT DEMAND ASSIGN FUNCTION IN MULTIMEDIA SYSTEMS HAVING STATISTICAL MULTIPLEXING TRANSMISSION

BACKGROUND OF THE INVENTION

1. Field of the Invention

The present invention relates to a demand assign multiplexer. More specifically, the invention relates to a demand assign multiplexer in a multimedia time division multiplexing system including a plurality of media and performing multiplexed transmission through a high speed digital dedicated line, which assigns a channel on a transmission line in response to a channel assignment demand from the included medium for establishing a communication path.

2. Description of the Related Art

Media incorporated in a multiplexer is required to transmit all of data, such as a voice signal without drop out once communication path is established. Namely, there are a plurality of transfer method from signal requiring guarantee of transparent data transfer to signals having protocol (e.g. X. 25, HDLC (High level Data Link Control procedure), SDLC (Synchronous Data Link Control), BSC (Binary Synchronous Communication) and so forth, capable of statistical multiplexing transfer, namely signals having a certain interval between data, such as a packet data.

Conventionally, in the multimedia multiplexer of this kind, when a demand assign function is employed, the signals which can be transferred in statistic multiplexing are dealt similarly to the signal which should be guaranteed transparent data transfer, to perform demand assign process.

However, since protocol is provided in the signal capable of statistical multiplexing transfer, if the demand assign process is performed as is for the data having protocol, a communication process has to be executed upon performing data transfer. Therefore, even in the condition where the multiplexer is connected to the communication path, dead period can be caused.

Therefore, even when the multiplexer is connected to the communication path in response to a demand from a terminal, there is a period when data transfer is not performed. Therefore, the multiplexing efficiency of demand assign process for the signals capable of statistical multiplexing data transfer can be degraded.

SUMMARY OF THE INVENTION

Therefore, it is an object of the present invention to solve the problems set forth above, and to provide a demand assign multiplexer for providing efficient demand assign function with respect to medium capable of statistic multiplexing transmission.

According to one aspect of the invention, a demand assign multiplexer comprises:

multiplexing means for multiplexing a signal which can be transmitted in a statistical multiplexing;

output means for outputting a channel assignment demand depending upon a signal from a system which requires guarantee of transparent data transfer which guarantees content of transfer in a normal state of a transmission path; and control means for controlling to perform demand assign process with channel assignment depending upon the output of said multiplexing means and the output of said output means;

In the preferred construction, the demand assign multiplexer further comprises channel assignment demand feeding means for feeding a channel assignment demand depending upon a data amount to be transmitted in statistic multiplexing manner;

detecting means for detecting said channel assignment demand from said output means and said channel assignment demand feeding means, said control means controlling demand assign process depending upon the result of detection by said detecting means.

The demand assign multiplexer further comprises:

release demand feeding means for feeding a release command for channel assignment depending upon the data amount of the signal which can be transmitted in statistic multiplexing manner; and means for releasing channel assignment depending upon said release demand from said channel assignment release demand feeding means.

According to another aspect of the invention, a demand assign multiplexer comprises:

multiplexing means for multiplexing a plurality of signals which can be transmitted in a statistical multiplexing;

output means for outputting a channel assignment demand depending upon each signal from a plurality of systems which requires guarantee of transparent data transfer which guarantees content of transfer in a normal state of a transmission path; and channel assignment demand feeding means for feeding a channel assignment demand depending upon a data amount to be transmitted in statistic multiplexing manner;

detecting means for detecting said channel assignment demand from said output means and said channel assignment demand feeding means, control means for controlling demand assign process depending upon the result of detection by said detecting means.

The demand assign multiplexer may comprise:

release demand feeding means for feeding a release command for channel assignment depending upon the data amount of the signal which can be transmitted in statistic multiplexing manner; and means for releasing channel assignment depending upon said release demand from said channel assignment release demand feeding means. The multiplexing means may includes a statistic multiplexing control portion which parses the signal which can be transmitted in statistic multiplexing manner and terminates control procedure and extracts only data necessary to be transmitted among said signal, and a statistic multiplexing portion which writes in the extracted data as transmission data.

When a total capacity of the transmission data extracted from the signal capable of transmission in statistic multiplexing manner is greater than or equal to a capacity of a statistic multiplexing outputs which are currently used, a channel assignment demand is issued. In the alternative, when a total capacity of the transmission data extracted from the signal capable of transmission in statistic multiplexing manner is less than a capacity of statistic multiplexing outputs which are currently used, and when the data written in or read out from said statistic multiplexing portion is greater than or equal to a release threshold, channel assignment is performed.

When the data written in or read out from said statistic multiplexing portion is greater than a predetermined connection threshold value, the channel assignment demand is issued.

When the data written in or read out from said statistic multiplexing portion is less than a predetermined connection threshold value and a total capacity of the transmission data extracted from the signal capable of transmission in statistic multiplexing manner is less than a capacity of statistic multiplexing outputs which are currently used, and the data written in or read out from said statistic multiplexing portion is less than a predetermined release threshold value, a channel assignment release demand is issued.

A plurality of multiplexing means for multiplexing signals which can be transmitted in statistic multiplexing manner, is provided in each of said control procedure.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 7 is an illustration showing a construction of another embodiment of the demand assign multiplexer according to the invention.

DESCRIPTION OF THE PREFERRED EMBODIMENT

The present invention will be discussed hereinafter in detail with reference to the accompanying drawings. In the following description, numerous specific details are set forth in order to provide a through understanding of the present invention. It will be obvious, however, to those skilled in the art that the present invention may be practiced without these specific details. In other instance, well-known structures are not shown in detail in order to unnecessary obscure the present invention.

Figure 1:
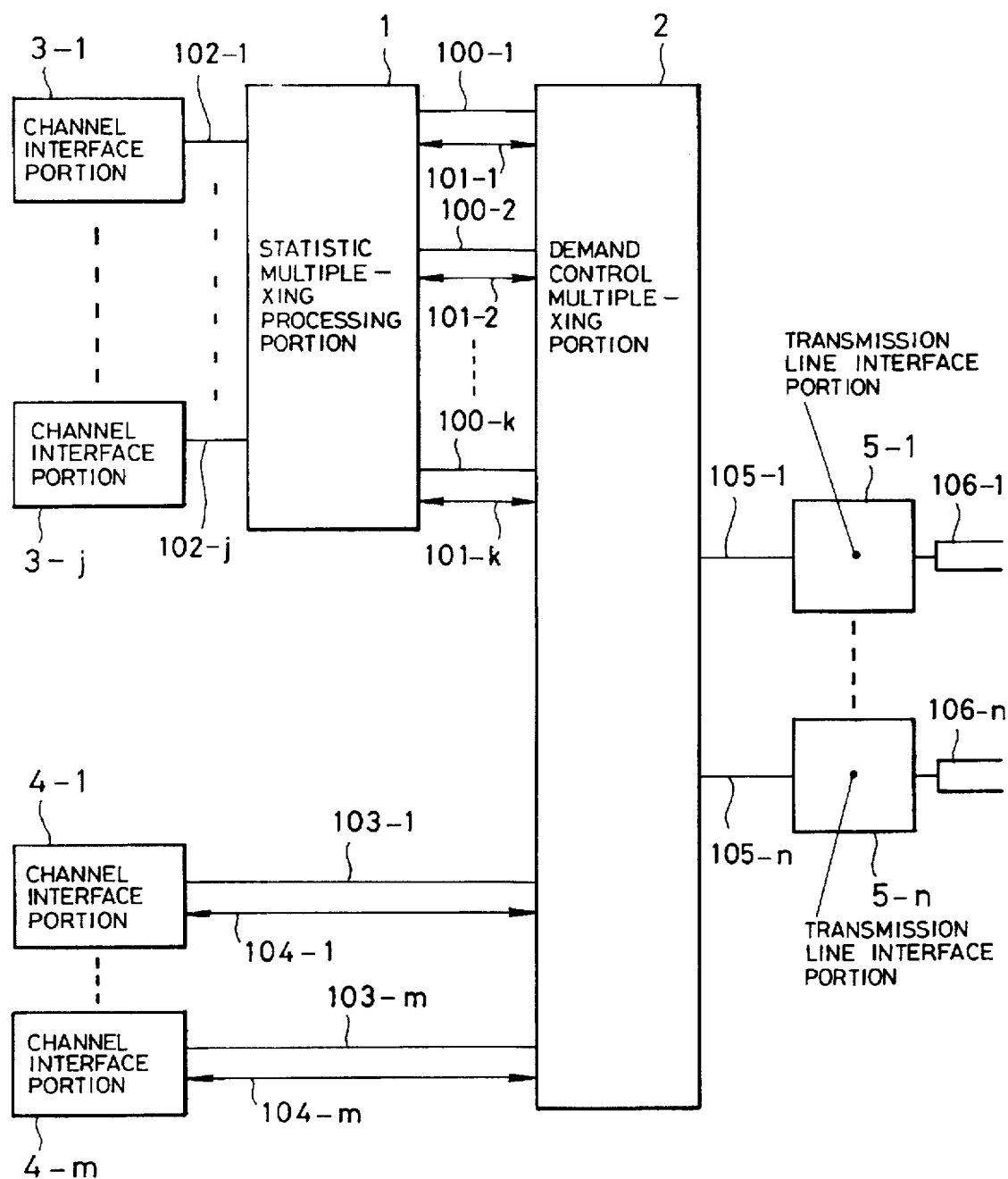
FIG. 1 is a block diagram showing one embodiment of a demand assign multiplexer according to the present invention.

FIG. 1 is a block diagram showing construction of one embodiment of a demand assign multiplexer according to the present invention. According to one embodiment of the invention, a demand assign multiplexer includes a statistic multiplexing processing portion 1, a demand control multiplexing processing portion 2, channel interface portions 3-1 to 3-j for signal capable of statistic multiplexing transmission, channel interface portions 4-1 to 4-m for signals which require guarantee of transparent data transfers, and transmission line interface portions 5-1 to 5-n.

One embodiment of the demand assign multiplexer according to the present invention has a two level construction of the statistic multiplexing processing portion 1 and the demand control multiplexing processing portion 2. The statistic multiplexing processing portion 1 and the demand control multiplexing processing portion 2 are connected through a plurality of sets of statistic multiplexing output lines 100-1 to 100-k and corresponding channel assignment demand signal lines 101-1 to 101-k.

The statistic multiplexing processing portion 1 performs statistic multiplexing process for signals which adapted for statistic multiplexing transmission, namely the signals supplied from channel interface portions 3-1 to 3-j connected to media (not shown) which can be transmitted in statistic multiplexing manner, through signal lines 102-1 to 102-j.

In such case, the statistic multiplexing processing portion 1 performs multiplexing control so that the number of statistic multiplexing output lines to be used always becomes minimum. The statistic multiplexing processing portion 1 outputs channel assignment demand and channel release demand for the demand control multiplexing processing portion 2 so that the channel assignment corresponds to number of the statistic multiplexing output lines 100-1 to 100-k currently being used.

The demand control multiplexing processing portion 2 is connected to the channel interface portions 4-1 to 4-m for signals which has to be guaranteed transparent data transfer, namely, to the media (not shown) which has to be guaranteed transparent data transfer, via signal lines 103-1 to 103-m and corresponding channel assignment demand signal lines 104-1 to 104-m.

On the other hand, the demand control multiplexing processing portion 2 is connected to transmission lines 106-1 to 106-n via signal lines 105-1 to 105n and transmission line interface portions 5-1 to 5-n.

The demand control multiplexing processing portion 2 is responsive to channel assignment demand or channel release demand through the channel assignment demand signal lines 101-1 to 101-k and the channel assignment demand signal lines 104-1 to 104-m, to perform channel assign process and channel release process for the transmission lines 106-1 to 106-n of the statistic multiplexing output lines 100-1 to 100-k and the signal lines 103-1 to 103-m.

The channel interface portions 3-1 to 3-j includes interface circuits which electrically convert the signal format of the media which can be transmitted in statistic multiplexing manner into the signal format within the demand assign multiplexer (signal format on the signal lines 102-1 to 102-j).

The channel interface portions 4-1 to 4-m includes interface circuits for electrically converting the signal format of the media which has to be guaranteed transparent data transfer into the signal format in the demand assign multiplexer (signal format on the signal lines 103-1 to 103-m), and a function for extracting channel assignment demand from the media.

It should be noted that as concrete examples of the channel assignment demand signal, connection demand signal information of CCITT V.25 bis recommendation, ER signal (control signal for connection and breaking state from a terminal) of CCITT V.24 recommendation, SS/SR signal information [control signal for connection and breaking of voice channel (CH) of PBX] from a private branch exchange (PBX) and so forth. Practically, variety of demand signal formats are present per media.

Normally, the multimedia multiplexer has a plurality of kinds of channel interface portions for adapting to a plurality of media.

The transmission line interface portions 5-1 to 5-n have the similar construction and operation to transmission line interface portion of the conventional time division multiplexing system, and include interface circuits which electrically convert signal format of the multiplexed signal transmitted from the demand control multiplexing portion 2 into the signal format of the transmission lines 106-1~106-n.

Figure 2:
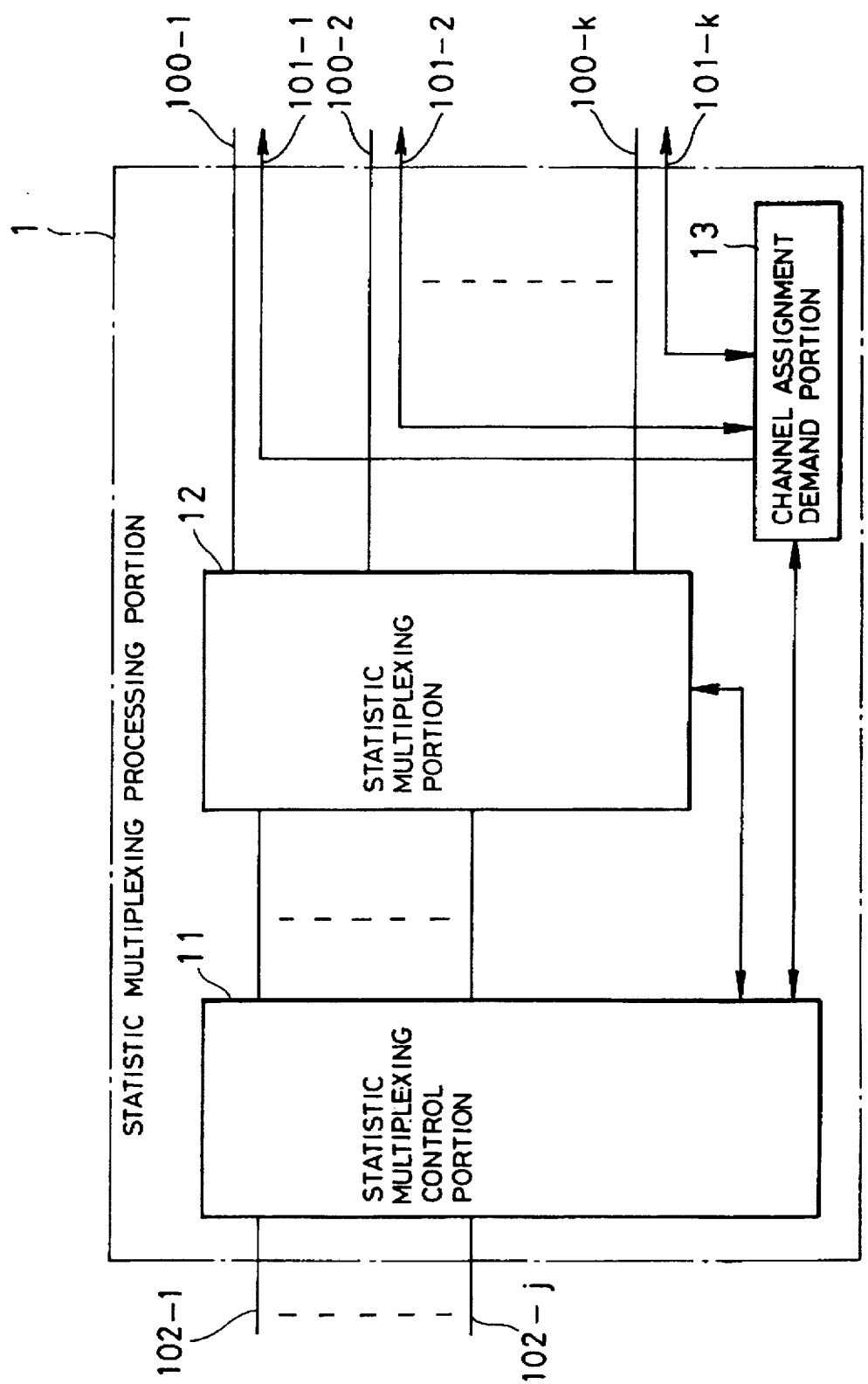
FIG. 2 is a block diagram showing a statistic multiplexing processing portion of one embodiment of the demand assign multiplexer of FIG. 1.

FIG. 2 is a block diagram showing a construction of the statistic multiplexing processing portion 1 of FIG. 1. In FIG. 2, the statistic multiplexing processing portion 1 comprises a statistic multiplexing control portion 11, a statistic multiplexing portion 12 and a channel assignment demand portion 13.

The statistic multiplexing control portion 11 terminates the protocol by analyzing data from the channel interface portions 3-1 to 3-j and picks up data requiring transmission from the data. The statistic multiplexing control portion 11 writes the picked up data in the statistic multiplexing portion 12 as transmission data.

Assuming that the statistic multiplexing output line 100-1 is currently used, the statistic multiplexing control portion 11 is responsive to increasing of the total capacity of the transmission data (signals on the signal lines 102-1 to 102-j) to be greater than or equal to the capacity of the statistic multiplexing output line 100-1, to demand use of the next statistic multiplexing output line 100-2 to the demand control multiplexing processing portion 2 from the channel assignment demand portion 13 via the channel assignment demand signal line 101-2.

On the other hand, assuming that the statistic multiplexing output lines 100-1 and 100-2 are currently used, the statistic multiplexing control portion 11 is responsive to decreasing of the total capacity of the transmission data (signals on the signal lines 102-1 to 102-j) to become less than the total capacity of the statistic multiplexing output lines now in active state, and to decreasing of a ratio of (output amount) /(input amount) with respect to the statistic multiplexing portion 12 to become less than a predetermined releasing threshold, to demand release of the current-used statistic multiplexing output line 100-2 to the demand control multiplexing processing portion 2 from the channel assignment demand portion 13 via the channel assignment demand signal line 101-2.

Figure 3:
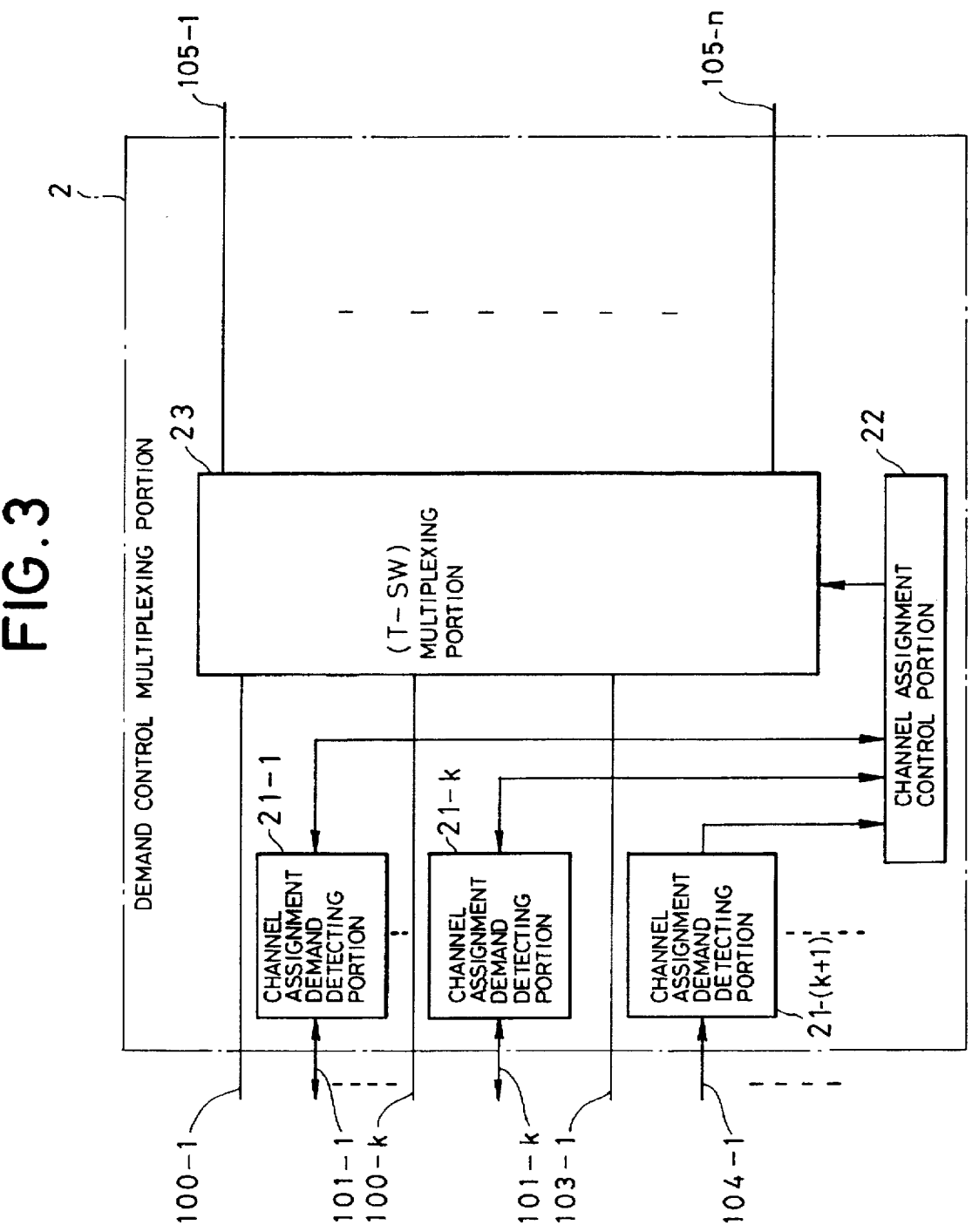
FIG. 3 is a block diagram showing a construction of a demand control multiplexing processing portion of one embodiment of the demand assign multiplexer of FIG. 1.

FIG. 3 is a block diagram showing the construction of the demand control multiplexing portion 2 in FIG. 1. In FIG. 3, the demand control multiplexing portion comprises a channel assignment demand detecting portion 21-1 to 21-(k+m) (the channel assignment demand detecting circuits 21-(k+2) to 21 -(k+m) are not shown in FIG. 3), a channel assignment control portion 22 and a multiplexing portion (T-SW) 23.

The channel assignment demand detecting portions 21-1 to 21-k decode and make judgement whether the channel assignment demand signals on the channel assignment demand signal lines 101-1 to 101-k are connection demand or release demand. The channel assignment demand detecting portions 21-(k+1) to 21-(k+m) decode and make judgement whether the channel assignment demand signals on the channel assignment demand signal lines 104-1 to 104-m are connection demand or release demand.

The channel assignment control portion 22 receives a notice from the channel assignment demand detecting portions 21-1 to 21-(k+m). When the notice is connection demand, vacant band on the transmission lines 106-1 to 106-n is retrieved. Then, assignment information is written in the multiplexing portion 23.

On the other hand, when the notice from the channel assignment demand detecting portion 21-1 to 21-(k+m) is the release demand, the channel assignment control portion 22 deletes the assignment information already written in the multiplexing portion 23.

Figure 4:
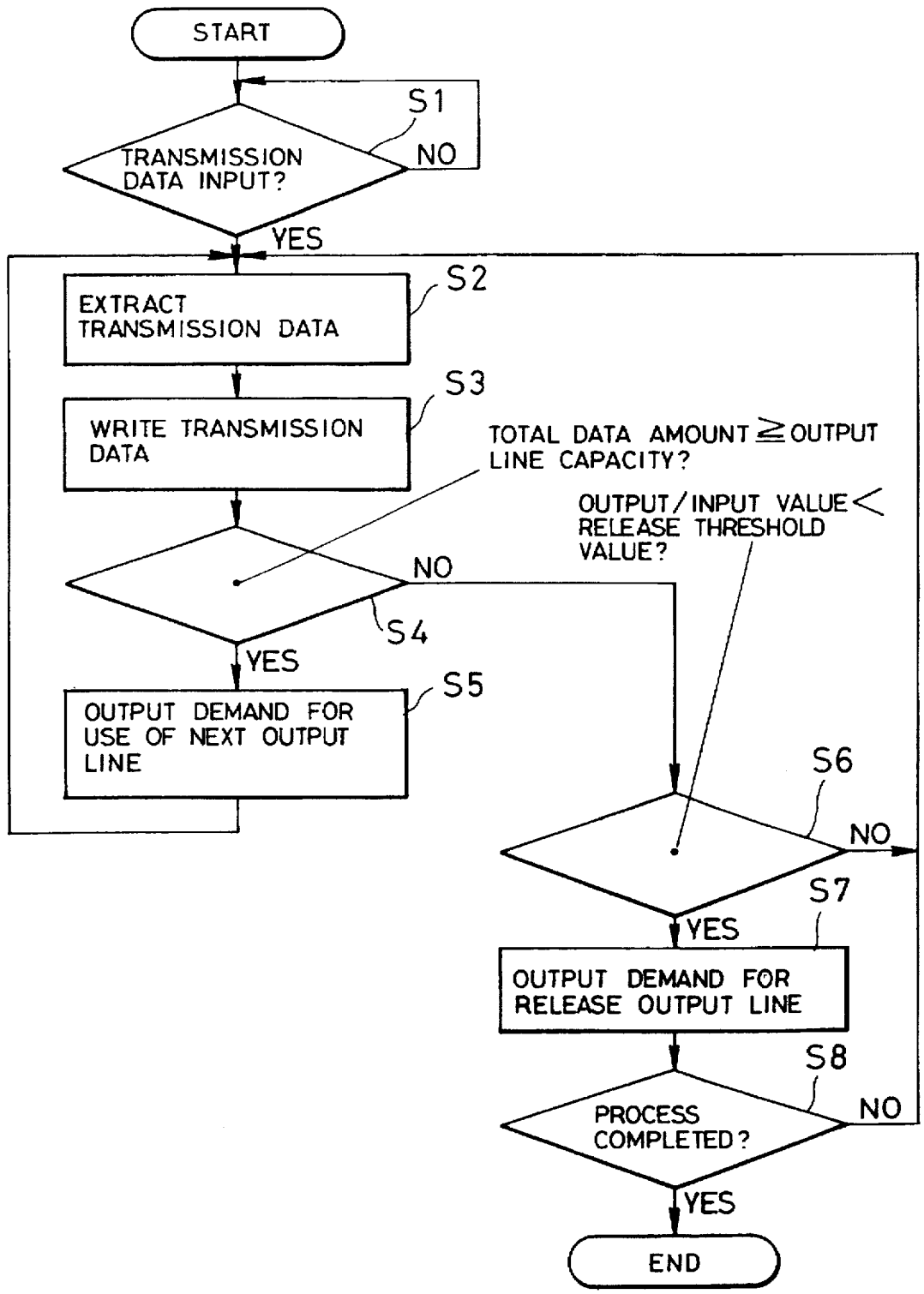
FIG. 4 is a flowchart showing an operation of the statistic multiplexing processing portion of FIG. 1.
Figure 5:
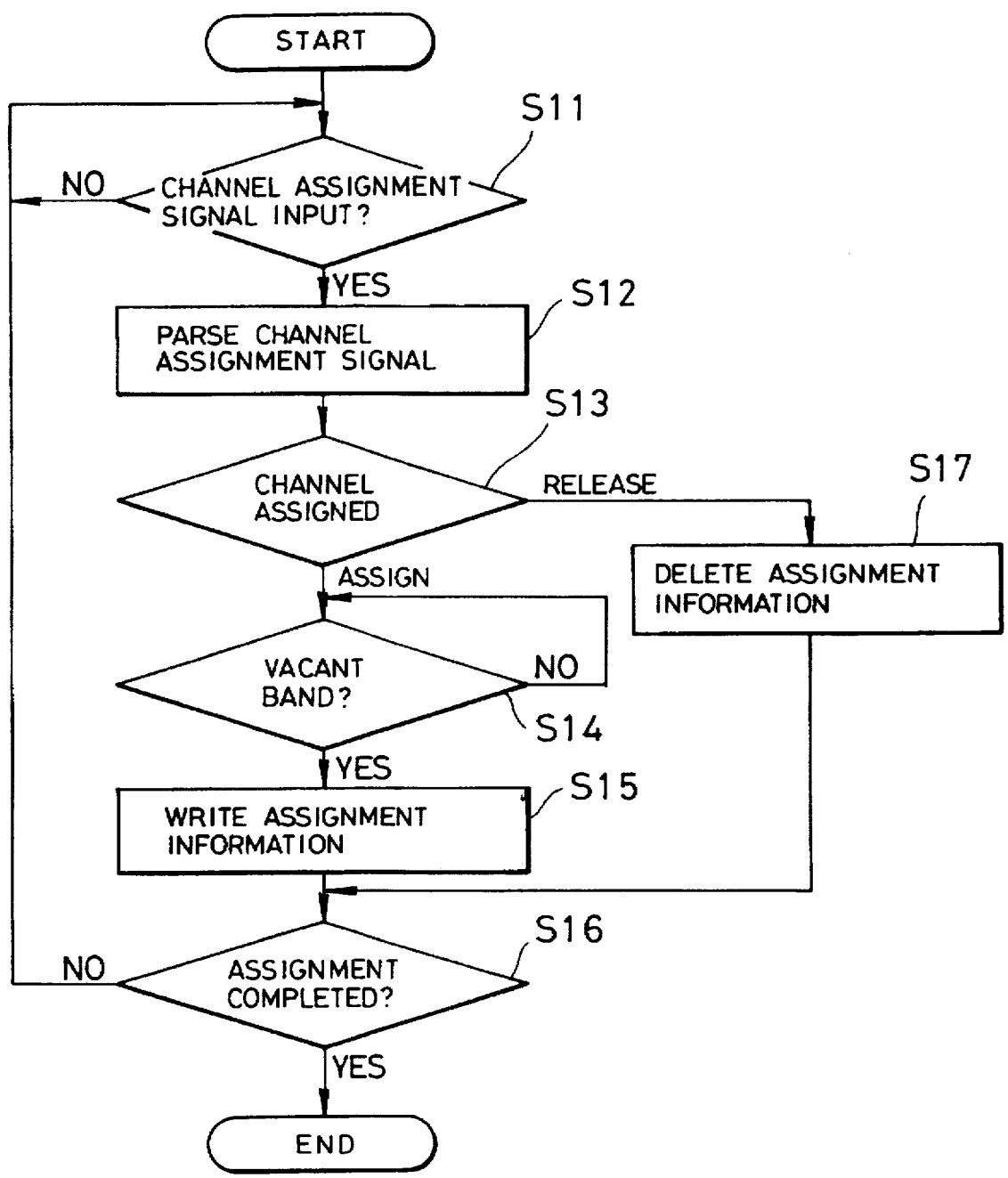
FIG. 5 is a flowchart showing an operation of the demand control multiplexing processing portion of FIG. 1.

FIG. 4 is a flowchart showing operation of the statistic multiplexing processing portion 1, and FIG. 5 is a flowchart showing operation of the demand control multiplexing processing portion 2. The operation of one embodiment of the demand assign multiplexer according to the present invention with reference to FIGS. 1 to 5.

The statistic multiplexing control portion 11 of the statistic multiplexing processing portion 1 parses data from the channel interface portions 3-1 to 3-j and terminates the protocol and makes judgement whether data necessary to be transmitted (step S1 of FIG. 4). Once data necessary for transmission is input, only data is extracted (step S2 of FIG. 4).

The statistic multiplexing control portion 11 writes in the extracted data as transmission data in the statistic multiplexing portion 12 (step S3 of FIG. 4).

Subsequently, the statistic multiplexing control portion 11 makes judgement whether the total amount of the transmission data of the signals on the signal lines 102-1 to 102-j is greater than the capacities of the statistic multiplexing output lines 100-1 to 100-k which are currently used (step S4 of FIG. 4).

When judgement is made that the total amount of the transmission data of the signals on the signal lines 102-1 to 102-j is greater than the capacities of the statistic multiplexing output lines 100-1 to 100-k which are currently used, the statistic multiplexing control portion 11 outputs a connection demand to the channel assignment demand portion 13 for using the statistic multiplexing output lines 100-1 to 100-k (step S5 of FIG. 4).

The channel assignment demand portion 13 feeds the connection demand for next statistic multiplexing output lines 100-1 to 100-k to the demand control multiplexing processing portion 2 via the channel assignment demand signal lines 101-1 to 101-k.

On the other hand, when the total amount of the transmission data of the signals on the signal lines 102-1 to 102-j is less than the capacities of the statistic multiplexing output lines 100-1 to 100-k which are currently used, the statistic multiplexing control portion 11 makes judgement whether the ratio of (output amount)/(input amount) of data for the statistic multiplexing portion 12 becomes smaller than or equal to a release threshold value (step S6 of FIG. 4).

When judgement is made that the ratio of (output amount) /(input amount) of data for the statistic multiplexing portion 12 is not less than the release threshold value, the statistic multiplexing control portion 11 returns the process to the step S2 to perform extraction of the transmission data and to write the transmission data in the statistic multiplexing portion 12.

On the other hand, judgement is made that the ratio of (output amount)/(input amount) of data for the statistic multiplexing portion 12 became less than the release threshold, the statistic multiplexing control portion 11 outputs the release demand for the signals on the statistic multiplexing output lines 100-1 to 100-k to the channel assignment demand portion 13 (step S7 of FIG. 4).

The channel assignment demand portion 13 feeds the release demand of the currently-used statistic multiplexing output lines 100-1~100-k to the demand control multiplexing processing portion 2 via the channel assignment demand signal lines 101-1 to 101-k.

Subsequently, the statistic multiplexing control portion 11 makes judgement whether the statistic multiplexing process is completed or not (step S8 of FIG. 4). When judgement is made that the statistic multiplexing process is completed, the statistic multiplexing process is terminated. On the other hand, when judgement is made that the statistic multiplexing process is not completed, process is returned to the step S2 for extracting transmission data and for writing the extracted data in the statistic multiplexing portion 12.

In the demand control multiplexing processing portion 2, when each of the channel assignment demand detecting portions 21-1 to 21-k detects each input of the channel assignment demand signal lines 101-1 to 101-k (step S11 of FIG. 5), by the channel assignment demand detecting portions 21-1 to 21-k, the signals on the channel assignment demand signal lines 101-1 to 101-k are decoded and judgement is made that the signal is connection demand or release demand (steps S12 and S13 of FIG. 5).

When each of the channel assignment demand detecting portions 21-(k+l) to 21-(k+m) detects each input of the channel assignment demand signal lines 104-1 to 104-m (step S11 of FIG. 5), by the channel assignment demand detecting portion 21-(k+l) to 21-(k+m), the signals on the channel assignment demand signal lines 104-1 to 104-m are decoded and judgement is made that the signal is connection demand or release demand (step S12 and S13 of FIG. 5).

The channel assignment control portion 22 is responsive to the notice from the channel assignment demand detecting portion 21-1 to 21-k to perform retrieval of a vacant band on the transmission lines 106-1 to 106-n when the notice is the connection command (step S14 of FIG. 5.) and writes the assignment information for the medium which can be transmitted in statistic multiplexing manner in the multiplexing portion 23 (step S15 of FIG. 5).

The channel assignment control portion 22 makes judgement whether the assignment process is completed or not (step S16 of FIG. 5). When judgement is made that assignment process is completed, the process is terminated. On the other hand, when the assignment process is judged not being completed, the channel assignment demand control portion 22 returns the process to the step S11 to be placed at the stand-by state for waiting input to the channel assignment demand signal lines 101-1 to 101-k or 104-1 to 104-m.

When the notice is received from the channel assignment demand detecting portions 21-1 to 21-k and if the notice is the release demand, the channel assignment control portion 22 deletes assignment information already written in the multiplexing portion 23 for the medium which can transmitted in statistic multiplexing manner (step S17 of FIG. 5).

The channel assignment control portion 22 makes judgement whether the assignment process is completed or not (step S16 of FIG. 5). When judgement is made that assignment process is completed, the process is terminated. On the other hand, when the assignment process is judged not being completed, the channel assignment demand control portion 22 returns the process to the step S11 to be placed at the stand-by state for waiting input to the channel assignment demand signal lines 101-1 to 101-k or 104-1 to 104-m.

On the other hand, when the notice is received from the channel assignment demand detecting portions 21-(k+l) to 21-(k+m) and the notice is the connection command, retrieval is performed for the vacant band on the transmission lines 106-1 to 106-n (step S14 of FIG. 5), and the assignment information for the medium which requires guarantee of transparent data transfer, is written in the multiplexing portion 23 (step S15 of FIG. 5).

The channel assignment control portion 22 makes judgement whether the assignment process is completed or not (step S16 of FIG. 5). When judgement is made that assignment process is completed, the process is terminated. On the other hand, when the assignment process is judged not being completed, the channel assignment demand control portion 22 returns the process to the step S11 to be placed at the stand-by state for waiting input to the channel assignment demand signal lines 101-1 to 101-k or 104-1 to 104-m.

When the notice is received from the channel assignment demand detecting portions 21-(k+l) to 21-(k+m) and the notice is the release command, the assignment information for the medium which requires guarantee of transparent data transfer, already written in the multiplexing portion 23, is deleted (step S17 of FIG. 5).

The channel assignment control portion 22 makes judgement whether the assignment process is completed or not (step S16 of FIG. 15). When judgement is made that assignment process is completed, the process is terminated. On the other hand, when the assignment process is judged not being completed, the channel assignment demand control portion 22 returns the process to the step S11 to be placed at the stand-by state for waiting input to the channel assignment demand signal lines 101-1 to 101-k or 104-1 to 104-m.

Figure 6:
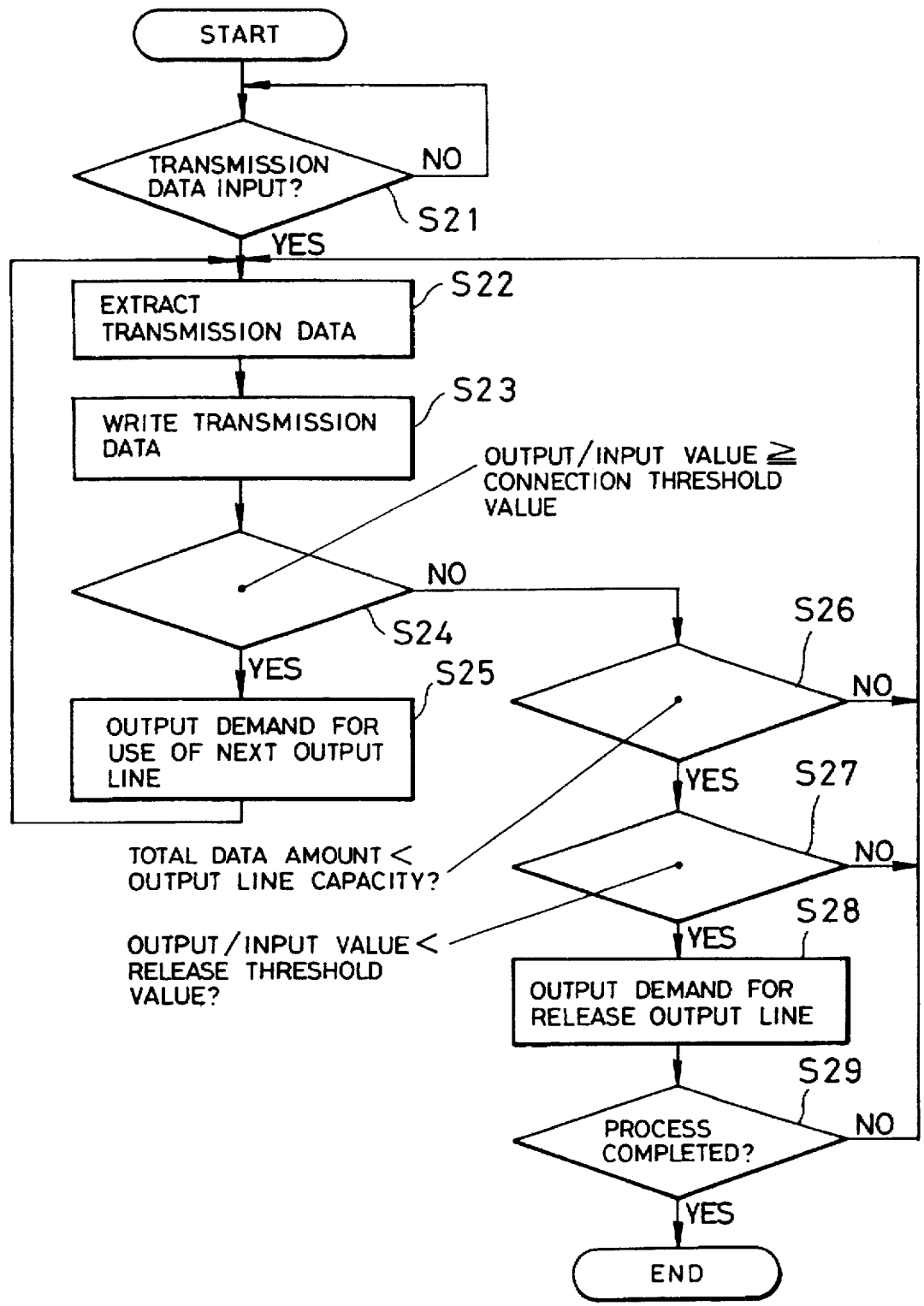
FIG. 6 is a flowchart showing operation of the statistic multiplexing processing portion of another embodiment of the demand assign multiplexer according to the invention.

FIG. 6 is a flowchart showing operation of a statistic multiplexing processing portion 1 of another embodiment of the demand assign multiplexer according to the present invention. In FIG. 6, except for difference of operation of the statistic multiplexing of the another embodiment of the demand assign multiplexer of the present invention to that of the former embodiment, the shown embodiment is similar to the former embodiment in construction and operation.

Discussion will be given for the operation of the statistic multiplexing processing portion 1 of the shown embodiment of the demand assign multiplexer according to the invention will be discussed with reference to FIGS. 1 to 3 and 6.

The statistic multiplexing control portion 11 of the statistic multiplexing processing portion 1 parses data from the channel interface portion 3-1 to 3-j to terminate the protocol. Then, the statistic multiplexing control portion 11 makes judgement whether data necessary to be transmitted is input or not (step S21 of FIG. 6). Then, if the data requiring transmission is input, only data to be transmitted is extracted (step S22 of FIG. 6).

The statistic multiplexing control portion 11 writes the transmission data extracted at the step S22 in the statistic multiplexing portion 12 (step S23 of FIG. 6).

Subsequently, the statistic multiplexing control portion 11 makes judgement whether a ratio of (output amount)/(input amount) of data for the statistic multiplexing portion 12 becomes greater than or equal to a predetermined connection threshold or not (step S24 of FIG. 6).

When the statistic multiplexing control portion 11 makes judgement that the ratio of (output amount)/(input amount) of data for the statistic multiplexing portion 12 becomes greater than or equal to a predetermined connection threshold, the statistic multiplexing control portion 11 outputs the connection demand for the statistic multiplexing output lines 100-2 to 100-k to the channel assignment demand portion 13 (step S25 of FIG. 6).

The channel assignment demand portion 13 feeds the connection demand for the statistic multiplexing output lines 100-2 to 100-k as the channel assignment demand signal on the channel assignment demand signal line 101-2 to the demand control multiplexing processing portion 2.

On the other hand, if judgement is made that the ratio of (output amount)/(input amount) of data for the statistic multiplexing portion 12 is not greater than or equal to the connection threshold, judgement is made whether the total amount of the transmission data on the signal lines 102-1 to 102-j is less than the capacity of the statistic multiplexing output lines 100-1 to 100-k currently used or not (step 26 of FIG. 6).

When judgement is made whether the total amount of the transmission data on the signal lines 102-1 to 102-j is less than the capacity of the statistic multiplexing output lines 100-1 to 100-k currently used, then judgement is made whether the ratio of (output amount)/(input amount) of data for the statistic multiplexing portion 12 is not less than the release threshold (step S27 of FIG. 6).

When judgement is made that the total amount of the transmission data on the signal lines 102-1 to 102-j is less than the capacity of the statistic multiplexing output lines 100-1 to 100-k currently used, or when judgement is made that the ratio of (output amount)/(input amount) of data for the statistic multiplexing portion 12 is not less than the release threshold, the statistic multiplexing control portion 11 returns the process to the step S22 to extraction of data and write the extracted transmission data to the statistic multiplexing portion 12.

On the other hand, when judgement is made that the ratio of (output amount)/(input amount) of data for the statistic multiplexing portion 12 is less than the release threshold, the statistic multiplexing control portion 11 outputs the release demand of the statistic multiplexing output lines 100-1 to 100-k to the channel assignment demand portion 13 (step S28 of FIG. 6).

The channel assignment demand portion 13 feeds the release demand for the statistic multiplexing output lines 100-1 to 100-k which are currently used to the demand control multiplexing portion 2 via the channel assignment demand signal lines 101-1 to 101-k.

Subsequently, the statistic multiplexing control portion 11 makes judgement whether the statistic multiplexing process is completed or not (step S29 of FIG. 6). When the completion of the statistic multiplexing process is judged, the process is terminated. On the other hand, judgement is made that the statistic multiplexing process is not yet completed, the process is returned to the step S22 to perform extraction of data and to write the extracted data in the statistic multiplexing portion 12.

FIG. 7 shows an illustration showing a construction of a further embodiment of the demand assign multiplexer according to the present invention. In FIG. 7, the shown embodiment of the demand assign multiplexer according to the invention comprises a plurality of statistic multiplexing processing portions 6-i (i=1, 2, . . .) connected to a plurality of media having various protocols and capable of transmission in statistic multiplexing manner, and the demand control multiplexing processing portion 7.

In the shown demand assign multiplexer, even when the protocols of the media capable of transmission in statistic multiplexing manner are mutually different, the statistic multiplexing processing portion 6-i parses data from the media to terminate protocols and writes only extracted data necessary to be transmitted. Depending upon the configuration of the media to be included, the combination of the statistic multiplexing processing portion 6-i and the demand control multiplexing processing portion 7 may be optimized.

As set forth above, the signals from the media which can be transmitted in statistically multiplexed manner terminated and multiplexed by the statistic multiplexing processing portion 1 is subject to be performed the demand assign process by the demand control multiplexing processing portion 2 together with the signal from the media which require guarantee of transparent data transfer, multiplexing type optimally adapted to respective transmission type of respective media can be taken to improve efficiency in multiplexing. Therefore, efficient demand assign function can be provided for respective media which can be transmitted in statistical multiplexing manner.

As set forth above, according to the present invention, by controlling demand assign process depending upon the output of the multiplexing means which multiplexes signal which can be transmitted in statistic multiplexing manner and the output of the output means outputting the demand for channel assignment depending upon the signal from the apparatus which requires guarantee of transparent data transfer, demand assign function can be efficiently provided for the media which can be transmitted in statistic manner.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A demand assign multiplexer comprising:

a multiplexing means for statistically multiplexing a plurality of signals which can be transmitted in a statistical multiplexing manner;

output means for outputting a channel assignment demand according to a signal which requires guarantee of transparent data transfer which guarantees content of transfer in a normal state of transmission path;

channel assignment demand feeding means for feeding a channel assignment demand depending upon a data amount to be transmitted in a statistic multiplexing manner;

detecting means for detecting said channel assignment demand from said output means and said channel assignment demand feeding means; and a control means for controlling a demand assign process according to a result of detection by said detecting means wherein said multiplexing means includes a statistic multiplexing control portion which parses a signal which can be transmitted in a statistical multiplexing manner, terminates control procedure, and extracts only data necessary to be transmitted among said signals, and a statistic multiplexing portion which receives the extracted data as transmission data.

2. The demand assign multiplexer as set forth in claim 1, which further comprises:

release demand feeding means for feeding a release command for channel assignment depending upon a data amount of the signal which can be transmitted in a statistic multiplexing manner; and means for releasing channel assignment depending upon said release demand from said channel assignment release demand feeding means.

3. A demand assign multiplexer comprising:

a multiplexing means for statistically multiplexing a plurality of signals which can be transmitted in a statistical multiplexing manner;

output means for outputting a channel assignment demand according to a signal which requires guarantee of transparent data transfer which guarantees content of transfer in a normal state of transmission path; and a control means for controlling a demand assign process according to an output of said multiplexing means and an output of said output means, wherein said multiplexing means includes a statistic multiplexing control portion which parses a signal which can be transmitted in a statistical multiplexing manner, terminates control procedure, and extracts only data necessary to be transmitted among said signals, and a statistic multiplexing portion which receives the extracted data as transmission data.

4. The demand assign multiplexer as set forth in claim 3, which further comprises:

channel assignment demand feeding means for feeding a channel assignment demand depending upon a data amount to be transmitted in statistic multiplexing manner;

detecting means for detecting said channel assignment demand from said output means and said channel assignment demand feeding means, said control means controlling demand assign process depending upon a result of detection by said detecting means.

5. The demand assign multiplexer as set forth in claim 3, which further comprises:

release demand feeding means for feeding a release command for channel assignment depending upon a data amount of the signal which can be transmitted in statistic multiplexing manner; and means for releasing channel assignment depending upon said release demand from said channel assignment release demand feeding means.

6. The demand assign multiplexer as set forth in claim 3, wherein when a total capacity of the transmission data extracted from the signal capable of transmission in said statistical multiplexing manner is greater than or equal to a capacity of a statistic multiplexing outputs which are currently used, a channel assignment demand is issued.

7. The demand assign multiplexer as set forth in claim 3, wherein when a total capacity of the transmission data extracted from the signal capable of transmission in said statistical multiplexing manner is less than a capacity of statistic multiplexing outputs which are currently used, and when the data written in or read out from said statistic multiplexing portion is greater than or equal to a release threshold, channel assignment is performed.

8. The demand assign multiplexer as set forth in claim 3, wherein when the data written in or read out from said statistic multiplexing portion is greater than a predetermined connection threshold value, the channel assignment demand is issued.

9. The demand assign multiplexer as set forth in claim 3, wherein when the data written in or read out from said statistic multiplexing portion is less than a predetermined connection threshold value and a total capacity of the transmission data extracted from the signal capable of transmission in said statistical multiplexing manner is less than a capacity of statistic multiplexing outputs which are currently used, and the data written in or read out from said statistic multiplexing portion is less than a predetermined release threshold value, a channel assignment release demand is issued.

10. The demand assign multiplexer as set forth in claim 9, wherein a plurality of multiplexing means for multiplexing signals which can be transmitted in statistic multiplexing manner is provided in each of control procedures.

* * * * *